United States Patent [19]

Shibata et al.

[11] Patent Number: 4,902,419

[45] Date of Patent: Feb. 20, 1990

[54] PRODUCT AND METHOD FOR FASTENING SOFT POROUS TUBES

[76] Inventors: Yoshihiko Shibata; Yoshihiro Chikamori; Yoichi Shimizu, all of 123, Minamigata, Yoshinaga-cho, Wake-gun, Okayama-ken 709-02, Japan

[21] Appl. No.: 341,345

[22] Filed: Apr. 21, 1989

[30] Foreign Application Priority Data

Apr. 22, 1988 [JP] Japan .................................. 63-98187

[51] Int. Cl.⁴ ........................ B01D 13/00; B29C 65/40
[52] U.S. Cl. .................... 210/321.89; 55/158; 264/127; 264/261; 264/263; 264/321; 428/36.9
[58] Field of Search ............... 264/127, 263, 261, 321; 428/36.9; 210/321.88, 321.89; 55/158

[56] References Cited

U.S. PATENT DOCUMENTS

| | | | |
|---|---|---|---|
| 3,697,635 | 10/1972 | Dietzsch et al. | 264/135 |
| 3,932,570 | 1/1976 | Cox et al. | 264/263 |
| 4,105,731 | 8/1978 | Yamazaki | 264/263 |
| 4,389,363 | 6/1983 | Molthop | 264/263 |
| 4,689,191 | 8/1987 | Beck et al. | 264/263 |

Primary Examiner—James Lowe
Attorney, Agent, or Firm—Gary A. Samuels

[57] ABSTRACT

A method for fastening soft porous polymer tubes into a fastening seat by remolding the tube ends by compression to remove porosity before insertion into the seat or pressure insertion of a hard, strong tube into each porous tube after insertion into the fastening seat to compress it. An adhesive is used to fill the seat to hold the tubes in place.

4 Claims, 1 Drawing Sheet

PRODUCT AND METHOD FOR FASTENING SOFT POROUS TUBES

BACKGROUND OF THE INVENTION

The field of the present invention relates to a method for fastening securely by a simple procedure soft, porous tubes and other parts which are soft as a result of being made porous.

The present invention may be used as a method for fastening soft parts such as porous resin tubes which are used for purposes of filtration, degassing or addition of active ingredients. By "porous" is meant gas permeable but not liquid permeable.

When a synthetic resin material, such as a paste molding of a tetrafluoroethylene resin is subjected to a rolling or drawing treatment, the structure of the material is made porous. In this way, a special structure which is permeable to gases but impermeable to liquids can be obtained. By using a part, such as a tube made from such a material, it is possible to remove gas components from liquids (degassing) or to add gases to liquids (gas diffusion). Of course, various types of filtration can be smoothly accomplished using such a tube.

However, in the case of such parts, such as tubes, the synthetic resin may have a porosity of 70% or greater (80% or greater in some cases). accordingly such parts are extremely soft. When such soft parts are fastened to degassing or gas diffusion mechanisms of the type described above, it is necessary to fasten the end portions of said parts to said mechanisms. This fastening is accomplished by screw-tightening using tube connectors and the like.

In order to perform an efficient degassing or gas diffusion treatment using the above tubes, it is desirable that the tubes themselves have a small diameter. However, in cases where such small-diameter tubes are fastened using the aforementioned tube connectors. said connectors have a relatively large external diameter, i.e. a diameter that is approximately five times the external diameter of the tubes. Furthermore, in order to fasten the tubes, it is necessary to apply a tool such as a spanner or monkey wrench to the connectors and to manipulate the tool. Accordingly, a space sufficient for the manipulation of such a tool must be left between adjacent connectors. As a result, the space required for the fastening of a single tube is unavoidably large. For example, in a case where tubes with an internal diameter of 2 mm. and an external diameter of 3 mm. are fastened, the maximum number of tubes that can be fastened to a flat fastening seat with a diameter of 140 mm. is twenty-five.

Furthermore, in cases where such tubes are fastened as is by bonding with an adhesive, the setting of the adhesive causes a shrinkage of the tube diameter, so that an appropriate bonding strength cannot be obtained. As a result, gaps may be created so that leakage occurs.

Accordingly, although connectors must be used in order to insure stable fastening, the need for space limits the number of tubes that can be installed per unit area to a small number. As a result, the benefits of efficient treatment and a compact apparatus cannot be achieved.

DESCRIPTION OF THE INVENTION

The present invention comprises a method for fastening soft porous tubes to a fastening seat in which the ends of the tubes that are to be fastened are hardened by filling the pores in the ends of the tubes. the filled and hardened parts of the tubes inserted into holes formed in the fastening seat so as to project above the fastening seat, and the tubes then fastened in place by filling the area into which the tubes project with an adhesive.

The method also includes a method for fastening soft porous tubes in which pipes or tubes with a high strength and hardness are pressure-fit into the ends of the soft, porous tubes so that said ends of the soft, porous tubes are hardened under pressure by coupling with said pipes or tubes either as is or in combination with compression of the pores in the ends of the soft, porous tubes that have been pre-hardened by filling. The ends of the soft porous tubes in which the ends are filled and hardened may be remolded if needed.

Since the ends of the soft porous tubes are hardened by filling the pores in said ends, the insertion of said tube ends into the holes formed in the fastening seat is facilitated. Furthermore, since these filled and hardened portions of the tubes are caused to project from the fastening seat and are fastened in place by means of an adhesive, there is no deformation or change in the dimensions of the tubes, i.e. no shrinking of the tubes in the fastening area. and secure fastening can thus be achieved.

The filling of the pores in the fastening ends of the tubes can easily be accomplished without any need for special fastening parts by closing the porous structure of said tube ends by melting. At the same time, an appropriate degree of hardness can also be obtained by the filling of the pores by melting.

DESCRIPTION OF THE PREFERRED EMBODIMENTS

Figure 1:
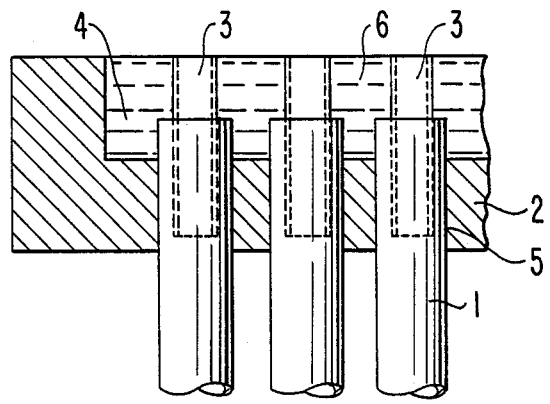
FIG. 1 is a partial magnified cross-section of an embodiment of the invention utilizing inserted hard tubes or pipes.

Referring now to the figures to better illustrate and delineate the invention, FIG. 1 describes the application of the method of the invention to the fastening of soft tubes 1, which have been made porous by a drawing treatment so that they are permeable only to gases, to a fastening seat 2. An adhesive fastening area 4 is formed in the top surface of the fastening seat 2, which contains holes 5 into which the tubes 1 are inserted. Next, thin-walled pipes 3, which are as tough as possible and which also have a high hardness, such as for example stainless steel pipes, are inserted into the ends of tubes 1 and the pores in the fastening ends of tubes 1 are filled by compression. The portions of the tubes that are hardened by this pore-filling treatment are inserted into holes 5 and an adhesive fastening layer 6 is formed around the portions of the tubes that project into the adhesive fastening area 4, so that the ends of tubes 1 are fastened by adhesion. Further, in cases where the pipes 3 are inserted into the fastening ends of tubes 1, it is not absolutely necessary to subject said fastening ends of tubes 1 to a separate compressive pore-filling treatment. However, such a pore-filling treatment may be appropriately performed as an auxiliary treatment.

Figure 2:
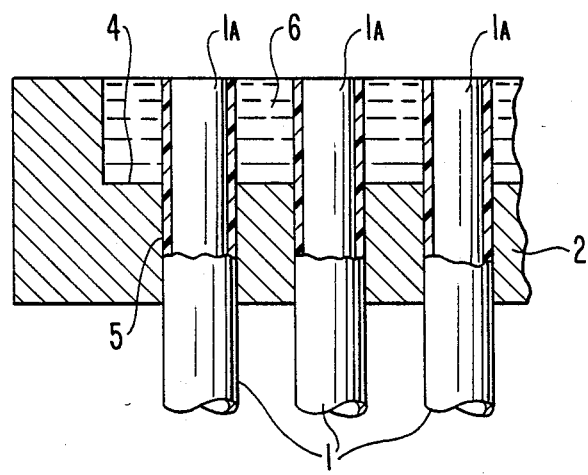
FIG. 2 shows another embodiment of the invention.

FIG. 2 illustrates another working configuration of the present invention. In this configuration, filled and hardened portions 1a are formed on the ends of tubes 1 that are to be inserted into fastening seat 2 and an adhesive fastening layer 6 is formed around the portions of the tubes that project into adhesive fastening area 4 in the same manner as in the configuration illustrated in FIG. 1. As a result, the filled and hardened portions 1a which constitute the end portions of tubes 1 are fastened in place by adhesion in the same manner as described above.

As to the method used to form the filled and hardened portions, the porous structure of the end portions of tubes 1 can be filled and hardened by subjecting said end portions to a partial melting treatment or to a compressive bonding treatment.

The use of either of the above methods (i.e., the method illustrated in FIG. 1 or the method illustrated in FIG. 2) eliminates the need for a space for the installation of a connector around the circumference of each tube 1. Furthermore, the need for a space for manipulation of a tightening tool such as a spanner or monkey wrench, for example, which would have to be used in order to tighten such a connector, is also eliminated. Accordingly, the spacing of tubes 1 fastened to fastening seat 2 can be substantially narrowed. It was confirmed by experimentation that approximately 220 porous polytetrafluoroethylene tubes 1 with an internal diameter of 2 mm. and an external diameter of 3 mm. can be fastened to a fastening seat 2 having a diameter of 140 mm. This is close to 10 times the number of tubes that can be installed using the conventional method.

It is clear that if it is thus possible to increase the number of tubes 1 that can be installed in a unit space, it is possible to perform an efficient treatment by means of a compact apparatus. Thus, such a treatment can be performed using an economical apparatus which requires little space.

The use of the present invention eliminates the need to use a screw-fastening mechanism employing connectors which are structurally complicated and unavoidably large in diameter in order to fasten methods. In the present invention, filled and hardened portions are formed on the ends of the tubes that are to be fastened, and these filled and hardened portions are securely fastened in place by means of a simple structure and method. Accordingly, there is no need for either a space for connector installation or a space for tool manipulation (i.e. manipulation of the tool used to tighten such connectors) in the fastening seat. As a result, the installation spacing of the abovementioned tubes can be narrowed so that it becomes possible to perform an efficient treatment by means of a compact apparatus. Thus, the present invention has great industrial advantages.

We claim:

1. A method for fastening soft porous polymer tubes to a fastening seat comprising the steps of:
   (a) hardening an end of each said tubes by filling the pores of said ends of each said tube.,
   (b) inserting said filled and hardened end of each said tube into holes inlet into said fastening seat so as to project above said fastening seat.,
   (c) fastening in place said tubes into said seat by filling the open volume into which said tubes project with an adhesive.

2. A method of claim 1 including hardening of an end of each said tube by insertion into it by pressure fitting of a hard and high-strength tube to fill the pores of said tube by compression of the soft material of said tube after said tube has been inserted in said fastening seat.

3. A method of claim 1 including filling the pores of each said tube by remolding each said tube by compressing the porous material of an end of each said tube prior to insertion in said fastening seat.

4. An assembly of soft porous polymer tubes fastened in place to a fastening seat by a method of claims 1, 2, or 3.

* * * * *